Figure 1:
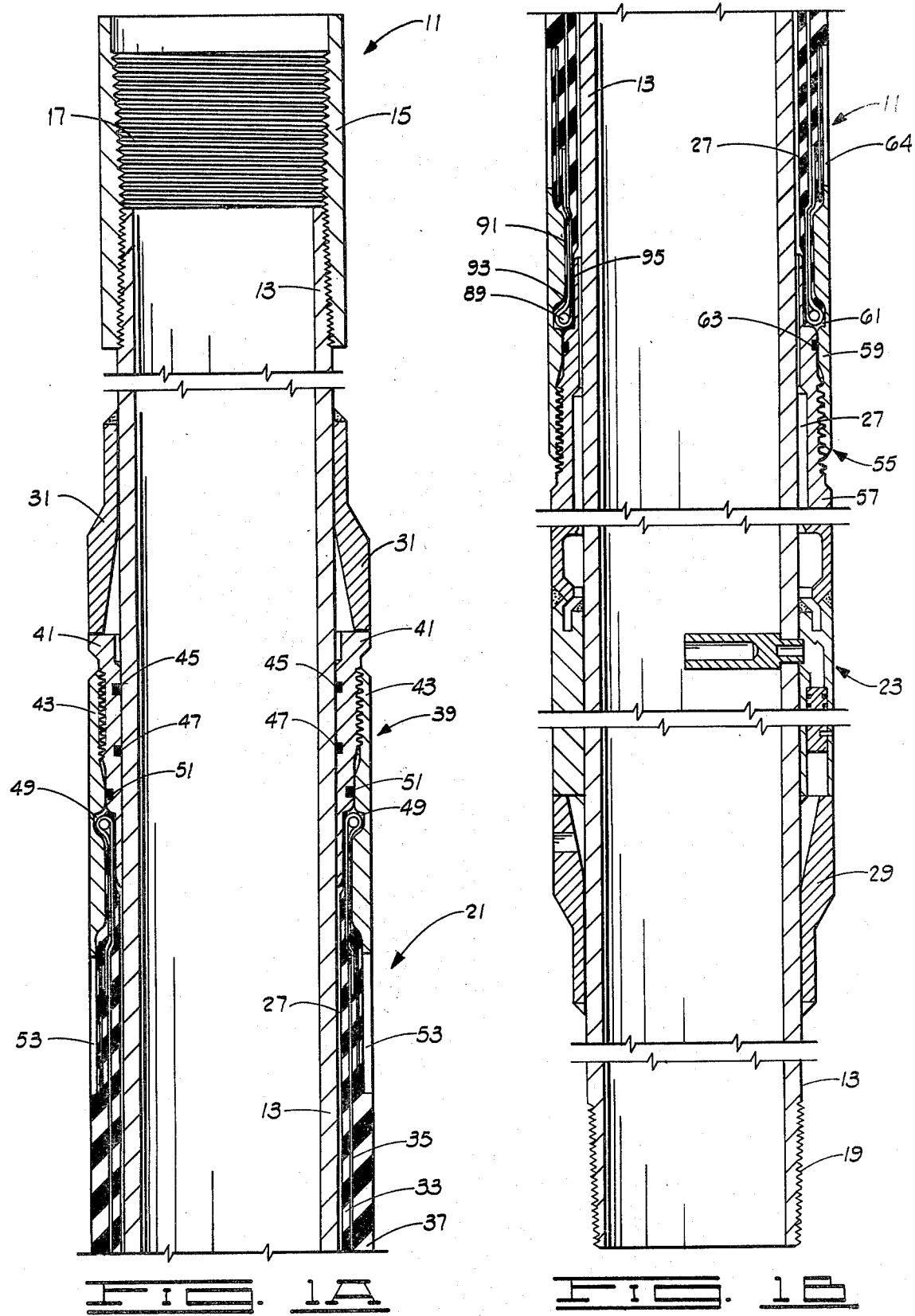

United States Patent [19]

Streich

[11] 4,310,161

[45] Jan. 12, 1982

[54] INFLATABLE PACKER ELEMENT

[75] Inventor: Steven G. Streich, Duncan, Okla.

[73] Assignee: Halliburton Services, Duncan, Okla.

[21] Appl. No.: 48,982

[22] Filed: Jun. 15, 1979

[51] Int. Cl.³ .............................................. F16J 15/46
[52] U.S. Cl. ..................................... 277/34; 277/121; 277/230
[58] Field of Search .................. 277/121, 212, 212 C, 277/230, 34, 34.3

[56] References Cited

U.S. PATENT DOCUMENTS

| | | | |
|---|---|---|---|
| 3,152,809 | 10/1964 | Waldrop | 277/212 C |
| 3,398,654 | 8/1968 | Waldrop | 277/212 C |
| 3,417,673 | 12/1968 | Bowerman | 277/212 C |
| 3,422,902 | 1/1969 | Bouchillon | 277/212 |
| 3,553,241 | 10/1970 | Bowerman et al. | 61/46.5 |
| 4,191,383 | 3/1980 | Baker | 277/121 |

Primary Examiner—Robert I. Smith
Attorney, Agent, or Firm—John H. Tregoning; James R. Duzan; Christopher H. Morgan

[57] ABSTRACT

An improved well packing device of the type having an inflatable bladder reinforced with a reinforcing material, and also having an annular end piece attached to the inflatable bladder. The reinforcing material is looped at one end about a toroidal member. This toroidal member is contained in an annular cavity of the end piece. A shoulder portion of the end piece forms a slot, narrower than the toroidal member, through which the reinforcing material extends, thus providing an improved connection between the inflatable bladder and the end piece.

9 Claims, 3 Drawing Figures

INFLATABLE PACKER ELEMENT

This invention relates generally to inflatable packer assemblies for sealing an annular cavity about a well casing or other tubular element, and more particularly, but not by way of limitation, to an improved means for connecting the end of a reinforced inflatable bladder to an annular member or end piece at the end of the packer assembly.

An inflatable packer is a downhole tool which can be inflated with well fluid to seal off the annular space between, for example, the casing and the well bore. It may also be used inside a casing.

Inflatable packers may be used in a well for a variety of reasons. They can be used to support a column of cement above a lost circulation zone. They can be used to isolate producing zones from cement contact. At times they can be used to centralize a casing during cementing operations. Also, they may be used to isolate production and lost circulation zones for gravel pack operations.

Inflatable packers of the prior art typically provide for connecting a reinforcing material of the inflatable bladder to annular members or end pieces at the ends of the packer by clamping the ends of the reinforcing element between two tapered surfaces. The two tapered surfaces are mechanically urged together by turning the two portions of the annular members which are threaded together. Typical examples of such prior art apparatus include U.S. Pat. No. 3,437,142 to Conover, No. 3,160,211 to Malone, No. 3,085,628 to Malone and No. 2,778,432 to Allen.

A continuing problem with these prior art apparatus is the failure of the connection between the reinforcing material of the bladder and the annular member at the end of the packer.

The present invention provides an improved connection between the reinforcing material and the annular member reducing the tendency for failure at this point.

In the present invention, the reinforcing material is looped at one end about a toroidal member. This toroidal member is contained in an annular cavity of the annular member or end piece. A shoulder portion of the annular member forms a slot through which the reinforcing material extends. During inflation, when the reinforcing material is in tension, the toroidal member is retained in the annular cavity since the toroidal member is larger than the slot formed by the shoulder portion of the annular member.

FIGS. 1A and 1B (hereinafter referred to as FIG. 1) depict, together, a sectional elevational view of the inflatable packer assembly of the present invention.

Figure 2:
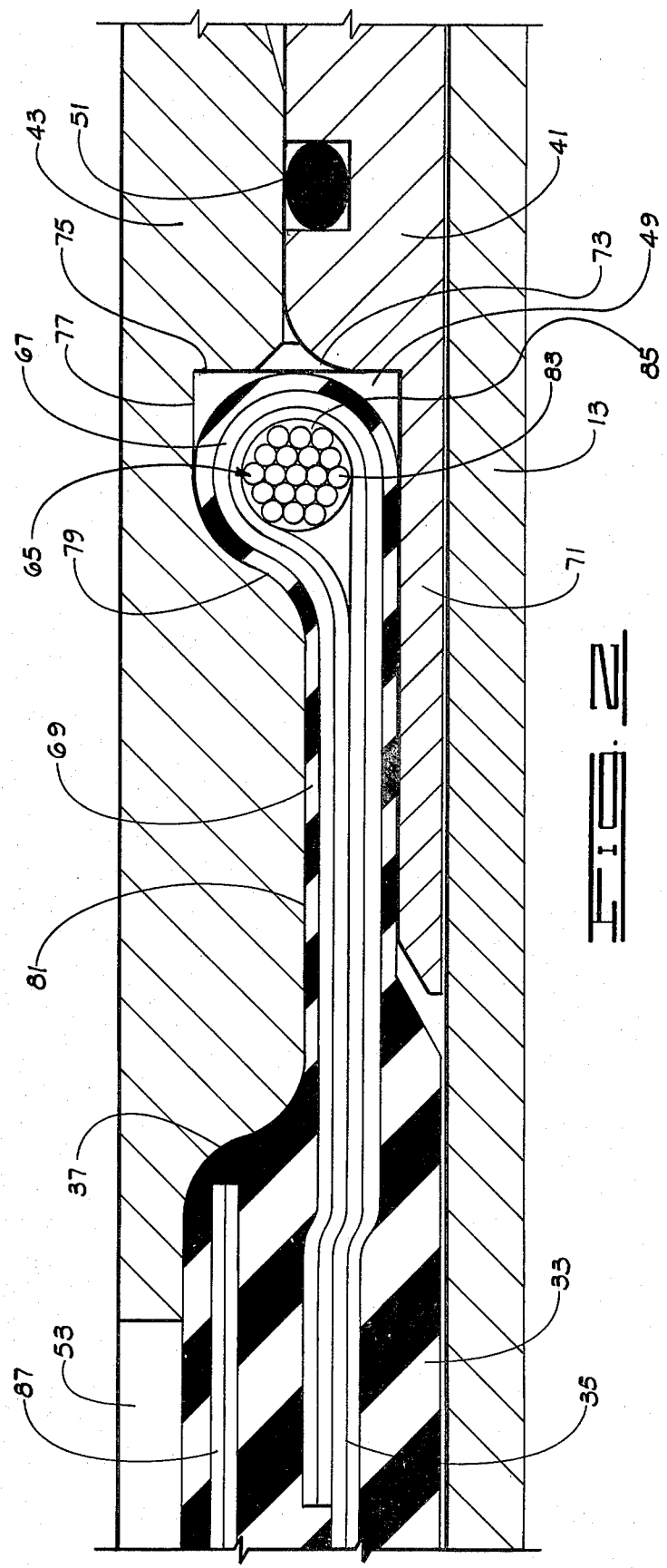

FIG. 2 is an enlarged sectional view of the connection between the end of the reinforcing material and the annular member at the upper end of the packer.

Referring now to FIG. 1, a casing inflation packer in accordance with the present invention is shown generally by the reference numeral 11. The inflatable packer 11 includes a tubular mandrel 13 which has an upper body connector 15 threadedly connected to its upper end. Upper body connector 15 has female threads 17 for receiving the lower threaded end of a casing string. The lower end of mandrel 13 has male threads 19 to be received in the upper threaded end of a casing string. In this manner, the casing inflation packer 11 can be received as part of a casing string.

An inflatable packer element generally designated by the numeral 21 is disposed about mandrel 13.

A control valve means, generally designated by the numeral 23, is disposed about mandrel 13 below and connected to packer element 21. Control valve 23 selectively supplies fluid under pressure from an interior of mandrel 13 to the area 27 between the inflatable packer element 21 and mandrel 13. The lower end of control valve 23 abuts a lower back-up ring 29.

The inflatable portion of packer element 21 includes a radially inner bladder 33 which is surrounded by a reinforcing material 35. A radially outer covering 37 surrounds reinforcing material 35. Bladder 33 provides a resilient, fluid-tight material for inflation. Reinforcing material 35 reinforces bladder 33 against the forces of high pressure fluids received in area 27 during inflation. Outer covering 37 protects and further seals reinforcing material 35.

Bladder 33 is preferably comprised of a tough, resilient, sealing material such as rubber. Reinforcing material 35 is preferably comprised of woven or braided strands of a flexible yet strong material such as steel or nylon. Particularly suitable is a product of E. I. dePont de Nemours and Company and marketed under the trademark "KEVLAR." "KEVLAR" is a synthetic organic fiber. Outer covering 37 is preferably comprised of a tough, resilient, sealing material such as rubber.

Referring to the upper end of packer element 21, an upper end piece designated generally by numeral 39 abuts the upper back-up ring 31. Upper end piece 39 is formed by two threaded bodies, upper packer body 41 and expanding shoe 43. Upper packer body 41 slidably engages mandrel 13 and abuts upper back-up ring 31. Seals 45 and 47 on the interior of upper packer body 41 press against mandrel 13 to provide a seal against fluid pressure during and after inflation. Expanding shoe 43 is threaded to upper packer body 41 and extends over an upper end portion of bladder 33 and reinforcing material 35. An annular cavity 49 is formed between upper packer body 41 and expanding shoe 43. An O-ring seal 51 seals the connection between body 41 and expanding shoe 43 above annular cavity 49.

Extending from the lower portion of expanding shoe 43 are a plurality of fingers, such as finger 53. During inflation, the fingers, such as 53, are bent outwardly by the inflatable portions of packer element 21. The fingers, such as 53, serve to protect the more fragile end portions of the inflatable packer element and to improve the packing or wedging action of the inflatable packer element as a whole.

The lower end of packer element 21 is comprised of a lower end piece 55 similar to upper end piece 39. Lower end piece 55 is formed by lower packer body 57 and expanding shoe 59 which is threaded to lower packer body 57. Lower packer body 57 surrounds mandrel 13 and is connected at its lower end to control valve 23. Expanding shoe 59 is threaded to body 57 and extends over the lower end portion of bladder 33 and reinforcing material 35. An annular cavity 61 is formed between body 57 and expanding shoe 59. An O-ring seal 63 seals the threaded connection between body 57 and expanding shoe 59 below cavity 61. A plurality of fingers, such as finger 64, extend from the upper end of expanding shoe 59 over bladder 33 and reinforcing material 35.

Referring now to FIG. 2, the connection between upper end piece 39 and reinforcing material 35 will be described in more detail. Inside cavity 49 is a toroidal retainer ring 65. The end portion of reinforcing material 35 is looped about retainer ring 65 and bonded to itself. In other words, the reinforcing material, looped and bonded to itself, forms a toroidal loop with retainer ring 65 contained inside the looped portion. This looped portion 67 of reinforcing material 35 is surrounded by a bonded layer of tough resilient sealing material 69. Sealing material 69 sealingly extends from bladder 33, inside reinforcing material 35, to covering 37 outside reinforcing material 35.

Preferably, the material used for sealing material 69 is the same as the material used for bladder 33.

Annular cavity 49 formed between upper packer body 41 and expanding shoe 43 contains the looped portion 67 of reinforcing material 35 and retainer ring 65. A flange 71 of packer body 41 separates cavity 49 from mandrel 13. The upper portion of cavity 49 is formed by a shoulder 73 of packer body 41 and a shoulder 75 of expanding shoe 43. The expanding shoe 43 also forms the outer wall 77 of annular cavity 49. A second shoulder 79 of expanding shoe 43 narrows cavity 49 to a slot 81. Thus, cavity 49 is formed by the flange 71 and shoulder 73 of packer body 41 and shoulder 75, wall 77 and shoulder 79 of expanding shoe 43.

The looped portion 67 of reinforcing material 35 and retainer ring 65 are contained in cavity 49. Reinforcing material 35 extends through slot 81. Preferably, the looped end of reinforcing material 35, which is bonded to itself, extends at least through slot 81. Slot 81, formed by shoulder 79, is narrower than the looped portion 67 of reinforcing material 35 and retainer ring 65. During and after inflation, reinforcing material 35 is placed in tension. However, since slot 81 is narrower than the looped portion 67 of reinforcing material 35 and retainer ring 65, reinforcing material 35 is held in connection with end pieces 39 during and after inflation.

Preferably, shoulder 79 is smooth and mates with retainer ring 65 and the looped portion 67 of reinforcing material 35.

Still referring to FIG. 2, reinforcing material 35 is comprised of at least two layers of a synthetic fiber, such as "KEVLAR." The first layer is wrapped in a 15° spiral with respect to the center line of mandrel 13. The second layer is wrapped in an opposite 15° spiral. To provide improved inflation characteristics, the two layers are not bonded together over at least a part of the inflatable portion of reinforcing material 35.

Retainer ring 65 is comprised of a central braided steel cable 83 wrapped with a layer of leather 85. Leather layer 85 protects reinforcing material 35 from the surface of cable 83.

Within covering 37 and beneath the plurality of fingers such as 53 are two additional layers of reinforcing material 87 also laid on 15° with center line. These additional layers of reinforcing material 87 give added protection in the critical area beneath the plurality of fingers such as 53.

Lower end piece 55 is connected to the lower end of reinforcing material 35 in the same manner as upper end piece 39 is connected to the upper end of reinforcing material 35. Inside cavity 61 the lower end of reinforcing material 35 is looped around a retainer ring 89 and bonded to itself. This looped end is surrounded by a sealing material 91. A shoulder 93 of expanding shoe 59 narrows cavity 61 to a slot 95 through which reinforcing material 35 extends. Slot 95 is narrower than the looped end of reinforcing material 35 and retainer ring 89.

During assembly, reinforcing material 35 is wrapped around a molding mandrel and an inner layer of rubber is applied and bonded to material 35. The ends are then looped over the retainer rings and the reinforcing material which is looped over is bonded to itself. A second layer of rubber is then applied and bonded to the outside of reinforcing material 35. Reinforcing material is then wrapped around the areas under the fingers of the expanding shoes. Finally, a last layer of rubber completes the outer covering 37.

In assembly of the inflatable material to the end pieces, the surfaces of cavities 49 and 61 and slots 81 and 95 are lubricated. Retainer rings 65 and 85 are then placed in their respective positions inside expanding shoe 43 and expanding shoe 59. The braided nature of rings 65 and 85 allows sufficient flexibility for positioning despite close tolerances. Upper packer body 41 is then threaded onto expanding shoe 43 and lower packer body 57 is threaded onto expanding shoe 59.

Referring now to both FIGS. 1 and 2, the inflation process will be described. During inflation, high pressure fluid enters the area 27 between the packer element 21 and mandrel 13. This causes the bladder 33 to expand. The upper end piece 39 is drawn down towards lower end piece 55. The metal fingers of expanding shoe 43 and expanding shoe 59 are bent outwardly along with the bladder 33. When bladder 33 has reached the limits of its expansion, sharp angles are formed in the bladder at upper end piece 39 and lower end piece 55. These sharp angles produce a tension gradient across the inflatable material. Thus, the inner portion of the material is under greater tension than the outer portion of the material.

Even though sealing material 69 and bladder 33 are not bonded to either mandrel 13 or end piece 39, no fluid is lost during or after inflation. The pressure of sealing material 69 against shoulder 79 prevents this loss. As the pressure beneath bladder 33 increases so does the pressure of sealing material 69 against shoulder 79.

From the above description it can be seen that inflation causes tension forces to be applied along reinforcing material 35. These forces cause retainer ring 65 to be urged into slot 81 which wedges reinforcing material 35 against retainer ring 65. Shoulder 79 and flange 71 receive and counter these forces. It is notable that most of the retaining forces are thereby applied over the smooth surfaces of shoulder 79, flange 71, and retainer ring 65. As the fluid pressure increases, the forces on shoulder 79 and flange 71 increase which increases the wedging action. It is also notable that the inner portion of the inflatable material is free to shift slightly with respect to the outer portion of the inflatable material, helping to reduce the tension gradient described above.

Thus, the inflatable packer assembly of the present invention is well adapted to attain the objects and advantages mentioned as well as those inherent therein. While presently preferred embodiments of the invention have been described for the purpose of this disclosure, numerous changes in the construction and arrangement of parts can be made by those skilled in the art which changes are encompassed within the spirit of this invention as defined by the appended claims.

The foregoing disclosure and the showings made in the drawings are merely illustrative of the principles of this invention and are not to be interpreted in a limiting sense.

What is claimed is:

1. An improved well packing device of the type having a section of inflatable material for expansion upon inflation, the inflatable material being reinforced with a reinforcing material, the device further having at least one annular end piece attached to said inflatable material, the improvement comprising:
   a toroidal member;
   an end portion of the reinforcing material extending around said toroidal member; and
   said annular end piece comprising a first annular body having an annular trough formed in its radially inner surface which receives said toroidal member and a second annular body the radially outer surface of which extends adjacent said first annular body enclosing said trough and forming a slot which extends axially from said trough and through which the reinforcing material extends, said slot being sufficiently narrow to prevent said toroidal member from moving therethrough such that said end portion of the reinforcing material is retained with respect to said first and second annular bodies.

2. An improved well packing device of the type having a section of inflatable material for expansion upon inflation, this material being reinforced with a reinforcing material, this device further having at least one annular end piece attached to the resilient material, the improvement comprising:
   a retainer ring to which an end portion of the reinforcing material is attached; and
   the annular end piece comprising a first annular body and a second annular body, the radially inner surface of the first annular body being diposed adjacent the radially outer surface of the second annular body such that a cavity is formed therebetween and a slot, narrower than said retainer ring, extends axially from said cavity, said retainer ring being contained in said cavity and said material extending through said slot such that said material is retained with respect to the annular end piece due to its attachment to said retainer ring disposed in said cavity.

3. The device of claim 2 wherein the reinforcing material is looped about the retainer ring, the end of the looped reinforcing material extending through said slot.

4. An inflatable packer element comprising:
   a toroidal member;
   an inflatable bladder means including reinforcing material, said reinforcing material being attached to said toroidal member; and
   an annular end piece comprising a first annular body having an annular trough formed in its radially inner surface which receives said toroidal member, and a second annular body the radially outer surface of which extends adjacent said first annular body enclosing said trough and forming a slot which extends axially from said trough and through which the reinforcing material extends, said slot being sufficiently narrow to prevent said toroidal member from moving therethrough such that the reinforcing material is retained with respect to said first and second annular bodies.

5. The inflatable packer element of claim 4 wherein the reinforcing material is looped about said toroidal member, the looped end of the reinforcing material extending at least through said slot.

6. The inflatable packer element of claim 5 wherein the toroidal member comprises a steel cable wrapped with leather and where the reinforcing material comprises a synthetic fiber.

7. An inflatable packer element comprising:
   a toroidal member;
   an inflatable material, said inflatable material being attached to said toroidal member; and
   an annular end piece for sealing and protecting said inflatable material, said annular end piece comprising a first annular body having an annular trough formed in its radially inner surface which receives said toroidal member, and a second annular body the radially outer surface of which extends adjacent said first annular body enclosing said trough and forming a slot which extends axially from said trough and through which the inflatable material extends, said slot being sufficiently narrow to prevent said toroidal member from moving therethrough such that said end portion of the inflatable material is retained with respect to said first and second annular bodies.

8. The inflatable packer element of claim 7 wherein the inflatable material is looped about said toroidal member.

9. An inflatable packer element comprising:
   a toroidal member;
   an inflatable material, said inflatable material being attached to said toroidal member; and
   an annular end piece for sealing and protecting said inflatable material, said annular end piece having an annular cavity which contains said toroidal member, and said annular end piece having a shoulder portion with a smooth annular surface which is adjacent to and which mates with said toroidal member for retaining said toroidal member and said attached inflatable material in connection with said annular end piece during inflation.

* * * * *

UNITED STATES PATENT AND TRADEMARK OFFICE
CERTIFICATE OF CORRECTION

PATENT NO. : 4,310,161

DATED : January 12, 1982

INVENTOR(S) : Steven G. Streich

It is certified that error appears in the above-identified patent and that said Letters Patent are hereby corrected as shown below:

In the Claims:

Delete

"9. An inflatable packer element comprising:

a toroidal member;

an inflatable material, said inflatable material being attached to said toroidal member; and an annular end piece for sealing and protecting said inflatable material, said annular end piece having an annular cavity which contains said toroidal member, and said annular end piece having a shoulder portion with a smooth annular surface which is adjacent to and which mates with said toroidal member for retaining said toroidal member and said attached inflatable material in connection with said annular end piece during inflation."

UNITED STATES PATENT AND TRADEMARK OFFICE
CERTIFICATE OF CORRECTION

Page 2 of 2

PATENT NO. : 4,310,161
DATED : January 12, 1982
INVENTOR(S) : Steven G. Streich

It is certified that error appears in the above-identified patent and that said Letters Patent are hereby corrected as shown below:

Insert
--9. The inflatable packer element of claim 8 wherein the toroidal member comprises a steel cable wrapped with leather and wherein the inflatable material comprises a synthetic fiber and rubber.

Signed and Sealed this

Fourth Day of May 1982

[SEAL]

Attest:

GERALD J. MOSSINGHOFF

Attesting Officer

Commissioner of Patents and Trademarks